United States Patent
Muth et al.

(10) Patent No.: US 10,826,719 B2
(45) Date of Patent: Nov. 3, 2020

(54) NODE AND METHOD FOR CONDUCTING MEASUREMENTS AND SIGNAL ANALYSES ON A MULTI-MASTER ACCESS BUS

(71) Applicant: NXP B.V., Eindhoven (NL)

(72) Inventors: Matthias Berthold Muth, Niederschsen (DE); Georg Olma, Grasbrunn (DE)

(73) Assignee: NXP B.V., Eindhoven (NL)

( * ) Notice: Subject to any disclaimer, the term of this patent is extended or adjusted under 35 U.S.C. 154(b) by 90 days.

(21) Appl. No.: 16/205,778

(22) Filed: Nov. 30, 2018

(65) Prior Publication Data
US 2019/0182074 A1    Jun. 13, 2019

(30) Foreign Application Priority Data
Dec. 13, 2017 (EP) .................................. 17207139

(51) Int. Cl.
*H04L 12/40* (2006.01)
*H04L 12/413* (2006.01)
*H04L 29/06* (2006.01)
*H04B 3/46* (2015.01)
*H04L 12/26* (2006.01)

(52) U.S. Cl.
CPC ......... *H04L 12/40032* (2013.01); *H04B 3/46* (2013.01); *H04L 12/40* (2013.01); *H04L 12/413* (2013.01); *H04L 43/00* (2013.01); *H04L 69/12* (2013.01); *H04L 2012/40215* (2013.01)

(58) Field of Classification Search
None
See application file for complete search history.

(56) References Cited

U.S. PATENT DOCUMENTS

| | | | |
|---|---|---|---|
| 6,411,628 B1 * | 6/2002 | Hauck | G06F 13/368 370/447 |
| 6,535,216 B1 * | 3/2003 | Deming | G06T 1/20 345/502 |
| 6,559,783 B1 * | 5/2003 | Stoneking | H03M 1/1225 341/120 |
| 6,691,056 B2 | 2/2004 | Muth et al. | |
| 7,280,484 B1 | 10/2007 | Chow et al. | |
| 2002/0177913 A1 | 11/2002 | Fukae et al. | |
| 2006/0143363 A1 | 6/2006 | Steffan | |

(Continued)

FOREIGN PATENT DOCUMENTS

EP    0 867 813 A2    9/1998
EP    2 339 789 A1    6/2011

*Primary Examiner* — Duc T Duong
(74) *Attorney, Agent, or Firm* — Rajeev Madnawat

(57) ABSTRACT

The present application relates to a node for conducting measurements and signal analyses on a bus supporting multi-master access of a plurality of nodes or a transceiver of the node. The transceiver is configured to detect bus signals and to convert the detected bus signals into a bit stream. A protocol engine is arranged to receive the bit stream. The protocol engine transitions between states, which are indicative of at least an exclusive access phase, during which only one of the plurality of nodes is allowed to assert signals on the bus. A detector is configured to assert an enable indication for a period of time on detecting that the protocol engine is in a state indicative of the exclusive access phase. A diagnosis module is configured to conduct measurements in response to the asserted enable indication.

18 Claims, 10 Drawing Sheets

(56) References Cited

U.S. PATENT DOCUMENTS

| | | | |
|---|---|---|---|
| 2013/0139018 A1* | 5/2013 | Takada | H04L 12/417 |
| | | | 714/748 |
| 2014/0157035 A1* | 6/2014 | Vowe | G06F 1/12 |
| | | | 713/401 |
| 2015/0052405 A1* | 2/2015 | Maiolani | G06F 11/3656 |
| | | | 714/45 |
| 2015/0095711 A1* | 4/2015 | Elend | G06F 13/4072 |
| | | | 714/39 |
| 2016/0241418 A1* | 8/2016 | Kang | H04L 12/4013 |
| 2017/0257140 A1* | 9/2017 | De Haas | H04L 25/0272 |
| 2017/0262394 A1* | 9/2017 | De Haas | G06F 13/4282 |
| 2018/0245561 A1* | 8/2018 | Perez | B60R 16/023 |
| 2019/0098047 A1* | 3/2019 | Giannopoulos | H04L 63/1483 |

* cited by examiner

NODE AND METHOD FOR CONDUCTING MEASUREMENTS AND SIGNAL ANALYSES ON A MULTI-MASTER ACCESS BUS

CROSS-REFERENCE TO RELATED APPLICATIONS

This application claims the priority under 35 U.S.C. § 119 of European Patent application no. 17207139.1, filed on Dec. 13, 2017, the contents of which are incorporated by reference herein.

FIELD OF THE INVENTION

The present disclosure relates generally to a node and a transceiver connected to a multi-master bus, which in particular uses carrier sense multiple access/collision detection. More particularly, the present disclosure relates to the node and a transceiver performing measurements and signal analyses on the multi-master bus and the method of performing measurements and signal analyses on the multi-master bus.

BACKGROUND

The health of the physical layer of a CAN bus is important. The robustness of the CAN physical layer such as ISO 11898-2 cover up many electrical problems such as open, shorted, leaky, out-of-spec or unbalanced lines. The system reliability and stability can be reduced and may not be readily noticed and preventative testing should be done. Whereas standard equipment such as voltmeters and standard oscilloscopes is applicable in test environments to analyze the signaling on a CAN bus, there is still a need for an economic and reliable real-time analysis in applications while being in use.

SUMMARY

The present invention provides a node for conducting measurements and signal analyses on a bus supporting multi-master access of a plurality of nodes, a transceiver for conducting measurements and signal analyses on a bus supporting multi-master access of a plurality of nodes and a method for conducting measurements and signal analyses on a bus supporting multi-master access of a plurality of nodes as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1:
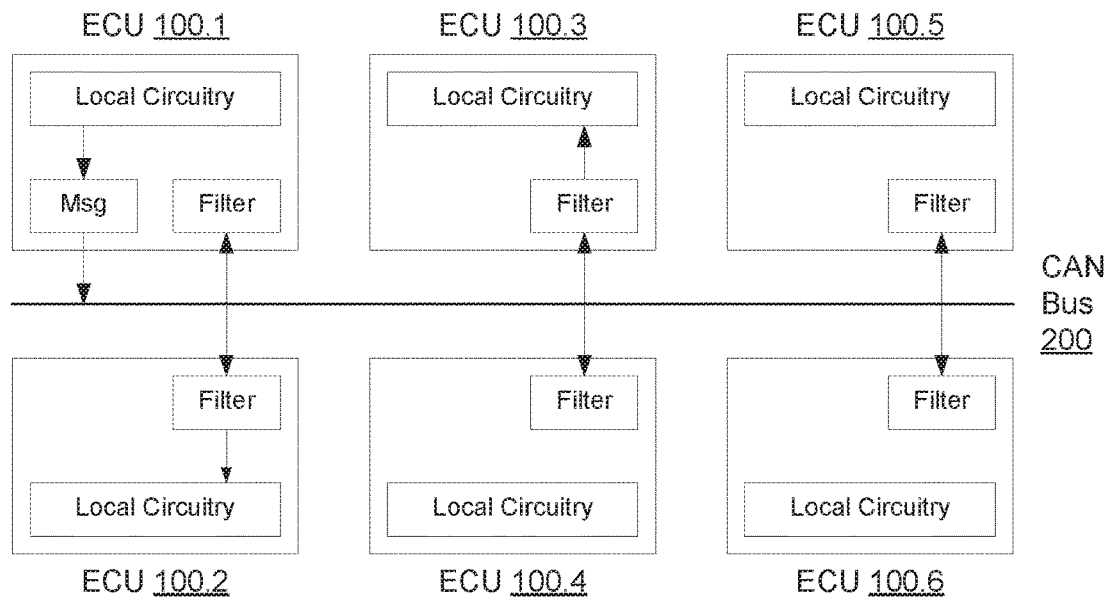
FIG. 1 schematically illustrates a block diagram of a CAN including several electronic control units, ECUs, according to an example of the present invention.

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The Controller Area Network, CAN, is a multi-master serial bus that connects electronic control units, ECUs, also referred to as (CAN) nodes in the following, for instance arranged inside a vehicle. Controller Area Network, CAN, enables a communication between the nodes without a central network controller. Each node is allowed to broadcast messages in form of data message frames on the CAN bus.

As schematically illustrated in FIG. 1, a node/ECU 100.1 broadcasts a data message frame Msg, which is received by all other nodes/ECUs 100.2 to 100.6 connected to the CAN bus 200. Each message data frame includes a message identifier, CANID, but does not need to include an identifier relating to the broadcaster/initiator and/or the receiver/target node. On the message data frame Msg broadcast over the serial CAN bus 200, each node receiving the broadcast message data frame Msg proceeds with filtering to determine whether to accept or ignore it. The filtering comprises checking at least a part of the data of the message data frame.

The filtering includes for instance checking the message identifier, CANID, to determine whether to accept or ignore it. For instance, the nodes/ECUs 100.3 and 100.2, accept the data message frame Msg, while the other nodes/ECUs 100.4, 100.5, and 100.6 discard the data message frame Msg. For instance, a filter unit in each node/ECU 100.1 to 100.6 compares the message identifier, CANID, of the data message frame Msg broadcast on the CAN bus 200 with one or more preconfigured message identifiers and forwards the message data to the local circuitry of the respective node/ECU 100.1 to 100.6 in case of a match. The filtering may not be limited to the message identifier, CANID, but may comprise further data of the message data frame Msg such as data of the data field or parts thereof.

To enable the ECU/nodes to broadcast data message frames on the CAN bus, a carrier sense multiple access (CSMA)/collision detection (CD) mechanism is implemented in the CAN communication protocol. Carrier sense multiple access (CSMA) requires that each node connected to a CAN bus is configured to monitor the CAN bus for no activity before trying to broadcast a message data frame on the CAN bus. This policy is described as carrier sensing. Once, the period of no activity is lapsed, every ECU/node on the CAN bus is allowed with equal opportunity to broadcast a message frame. This policy is described as multiple access. In case two or more nodes/ECUs start broadcasting at the same time, collision detection is performed by the broadcasting nodes/ECUs utilizing non-destructive bitwise arbitration. As a result of the non-destructive bitwise arbitration, only one of the two or more simultaneous broadcasting nodes/ECUs remains active and completes the broadcasting of the data message frame. The non-destructive bitwise arbitration is performed without corrupting the broadcasted data message frame wining the non-destructive bitwise arbitration.

In order to enable the non-destructive bitwise arbitration, two different logic signal are used on the CAN bus, a dominant bit signal representing a logic-0 signal and a recessive bit signal representing a logic-1 signal. If a logic-1 signal is asserted on the CAN bus by all currently broadcasting nodes/ECU at the same time then a logic-1 signal is detected by all nodes/ECU on the CAN bus. All nodes/ECU on the CAN bus include broadcaster nodes as well as the receiver nodes. If a logic-0 signal is asserted on the CAN bus by all currently broadcasting nodes/ECUs at the same time then a logic-0 signal is detected by all nodes/ECUs on the CAN bus. However, if a logic-0 signal is asserted on the CAN bus by one or more currently broadcasting nodes/ECU and a logic-1 signal is asserted by one or more currently broadcasting nodes/ECUs at the same time then a logic-0 is detected by all nodes/ECU on the CAN bus. A logic-0 signal or dominant bit signal asserted on the CAN bus overdrives a logic-1 or recessive bit signal asserted on the CAN bus at the same time.

A node/ECU currently asserting a logic-1 on the CAN bus and detecting a logic-0 signal active on the CAN bus at the same time realizes collision, in response to which the node/ECU aborts broadcasting.

CAN data frames are structured in accordance with frame formats. Four types of CAN frames may be distinguished: data frame that contains data to be broadcast; remote frame that requests data broadcast; error frame that is used on detection of an error in a received frame; and overload frame to inject a delay between frames.

In principle, the data frame format is structured into a header, a payload and a trailer. The header field comprises a Start Of Frame, SOF, field, an arbitration field with a message identifier, ID, and a control field. The payload comprises a data field and a CRC field to protect the data comprises in the data filed. The payload may further comprise a control filed. The polynomial for calculating the CRC sequence in the CRC field is predefined, the coefficients of which are given by the relevant bit stream. The trailer comprises an acknowledgement, ACK, field and an End Of Frame, EOF, filed. The trailer may further comprise an intermission field, IMF. A receiver node/ECU, which has received a valid message correctly, reports this to a broadcaster node/ECU by asserting a dominant signal during the acknowledgment phase on the CAN bus.

Figure 2:
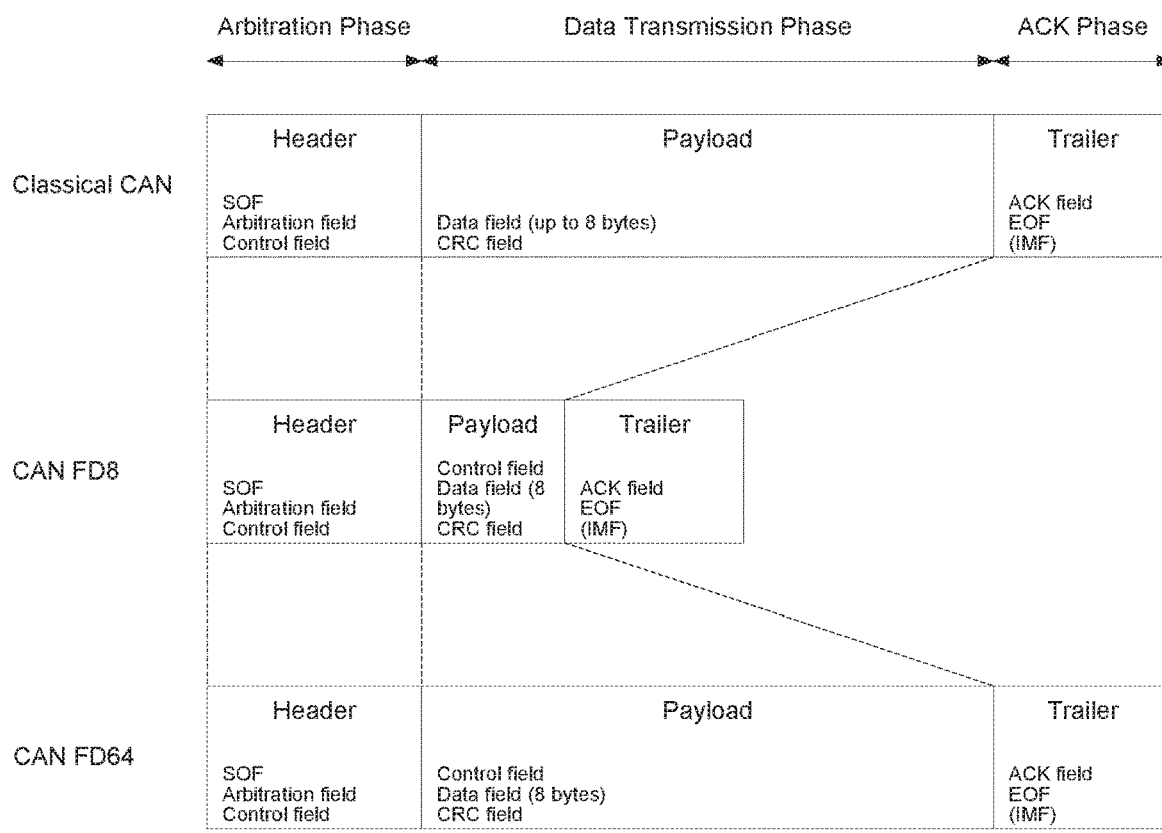
FIG. 2 schematically depicts the structure of CAN data frames of classical CAN, CAN FD8 and CAN FD64 for the sake of illustration.

FIG. 2 schematically shows exemplary CAN data frame formats for classical CAN, CAN FD8, CAN Flexible Data rate and a data field length of 8 bytes and a CAN FD64, CAN Flexible Data rate and a data field length of 64 bytes, for the sake of illustration only. It should be noted that the present invention should be understood to be limited neither to a specific bus protocol nor to a specific frame format used for communication on the bus.

As aforementioned, the CAN protocol implements multi-master access with non-destructive bitwise arbitration. The broadcasting of data frames starts with the assertion of the dominant Start Of Frame, SOF, bit (SOF is logic-0) followed by the bit sequence representing the arbitration field content. Hence, in case two or more data frames are broadcast at the same time, the data frame with the smallest arbitration field content wins the arbitration, in case the logic-0 signal is the dominant signal. Provided the same arbitration field content (and the message identifier, ID, respectively) is used only by one node/ECU, the non-destructive bitwise arbitration ensures that only one node/ECU asserts signals on the CAN bus during the data transmission phase the latest.

Figure 3:
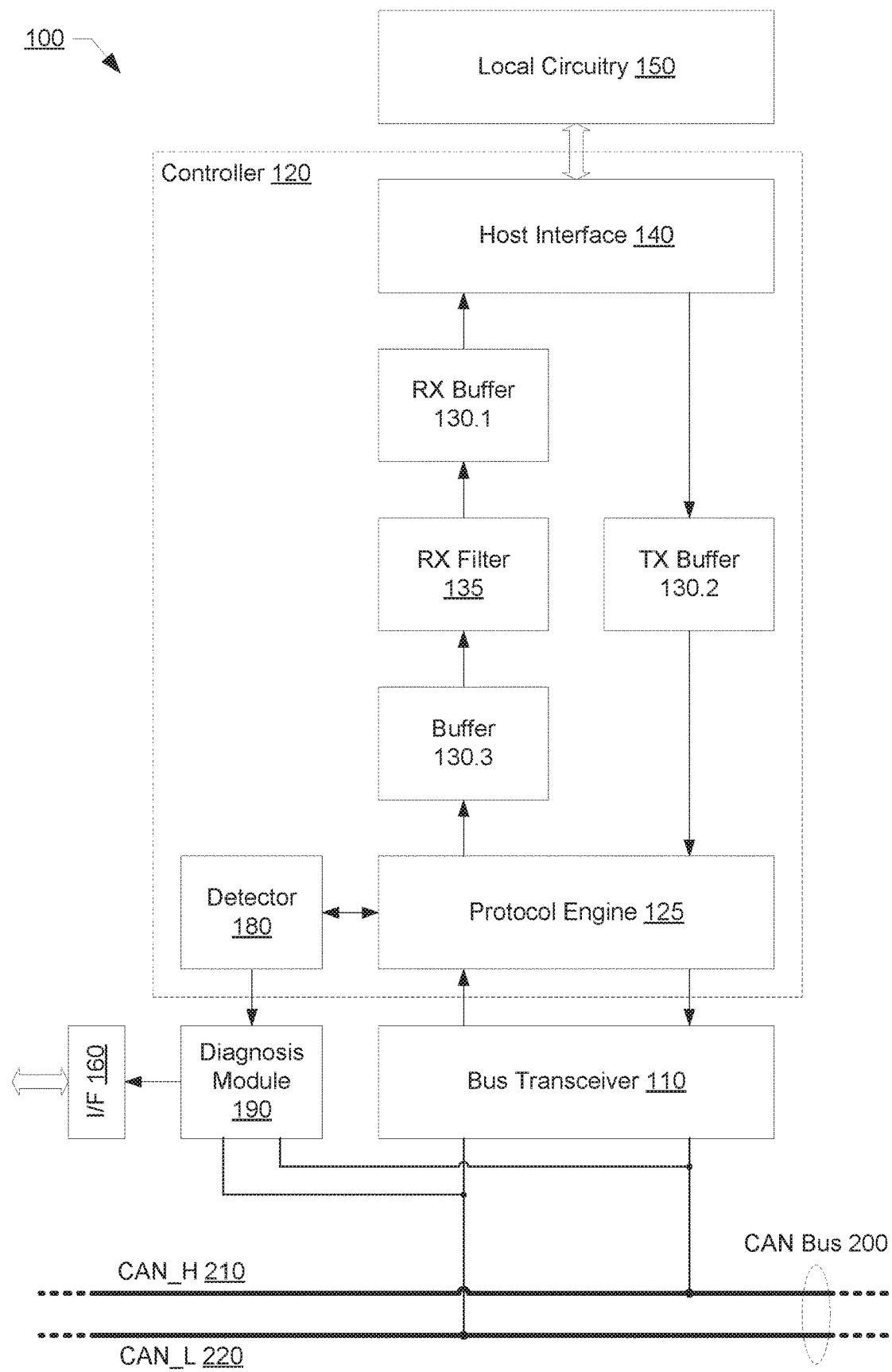
FIG. 3 schematically illustrates a block diagram of an electronic control unit, ECU, according to an example of the present invention.

Referring now to FIG. 3, a schematic block diagram of a node/ECU according to an embodiment of the present application is illustrated. The illustrated node/ECU 100 comprises a bus transceiver 110, which interfaces between the CAN bus 200 and the CAN controller/handler 120. The CAN controller/handler 120 enables communication between the local circuitry 150 of the node/ECU 100 and the bus transceiver 110. A host interface 140 of the CAN controller/handler 120 interfaces between the CAN controller/handler 120 and the local circuitry 150 of the node/ECU 100. In an example of the present application, the CAN controller/handler 120 is part of a microcontroller, MCU, or microprocessor, MPU, and the host interfaces 140 couples to a data bus of the microcontroller, MCU, or microprocessor, MPU. The host interfaces 140 may be further coupled to an interrupt controller (not shown) to signalize the presence of received message data available for being retrieved.

The bus transceiver 110 is configured to convert logic signals supplied by the CAN controller 120 into bus signals broadcast over the CAN bus 200 and to convert bus signals detected on the CAN bus 200 into logic signals supplied to the CAN controller 120. The bus transceiver 110 is arranged to accept from the CAN controller 120 logic signals representing a bit data stream of a frame to be broadcast on the CAN bus 200 and to output to the CAN controller 120 logic signals representing a bit data stream of a frame broadcast on the CAN bus 200.

In one example, the CAN bus 200 comprises two lines, on which bus signals are transmitted, for instance in from of two different differential signals representing the recessive and dominant signal states. The two bus lines are named CAN_H 210 and CAN_L 220. The two bus lines are arranged in form of a twisted signal wire pair for instance. The bus transceiver 110 converts received bus signals into logic levels for the CAN controller 120 and drives logic 0's onto the CAN bus 200. Those skilled in the art understand that the present invention is not limited to a specific implementation of the CAN bus 200. For instance, an unshielded single wire may be also used as bus medium.

The protocol engine 125 of the CAN controller 120 comprises a finite state machine, which is arranged to sequence through frames on a bit-by-bit basis, and change state for the various frame formats that are broadcasting or receiving. In particular, the protocol engine 125 is arranged to control the bit stream between transmit path and receive path in order to ensure that broadcasting, reception, arbitration, and error signaling are performed according to the CAN protocol.

Message data to be broadcast over the CAN bus 200 is loaded into the transmit TX buffer 130.2 via the host interface 140 by the local circuitry 150 of the node/ECU 100. The transmit TX buffer 130.2 may comprise several TX buffers for message data with different priorities levels. For instance, different priority levels may be assigned to the several TX buffers and the message data in the several TX buffers is broadcast on the CAN bus 200 based on the priority levels. Message data in a transmit TX buffer, which has assigned a higher priority level, is broadcast in advance of message data in a transmit TX buffer, which has assigned a lower priority level. The priority level may be part of an arbitration. The protocol engine 125 is for instance configured to compose a frame of prescribed format comprising the message data buffered in the transmit TX buffer 130.2 and to output the composed frame onto the CAN bus 200 via the bus transceiver 110. The protocol engine 125 is for instance arranged to output the composed massage frame in a serial stream of logic signals to the bus transceiver 110.

Similarly, the protocol engine 125 is arranged to receive frames in form of a serial streams of logic signals via the bus transceiver 110 interfacing with the CAN bus 200 and is further arranged to decompose the received frames according to the frame formats. The protocol engine 125 comprises a message assembly buffer, MAB, 130.3, which functions to monitor the CAN bus 200 for incoming messages. The message assembly buffer 130.3 holds a bit stream of a received frame supplied by the bus transceiver 110. In an example, the message assembly buffer 130.3 also holds a bit stream of a frame broadcast by the bus transceiver 110 on the CAN bus 200.

The acceptance RX filter 135 is provided to check whether a received frame is intended for the node/ECU 100, and if so, the transfer of the buffered bit stream into the receive RX buffer 130.1 is enabled by the acceptance RX filter 135. The acceptance RX filter 135 is arranged to receive at least the message identifier, CANID, in the buffered bit stream representing data of a received frame and configured to compare at least the message identifier, CANID, to one or more filter value(s). In an example, the acceptance RX filter 135 is arranged to receive the message identifier, CANID, and further data of the received frame such a part of the data of the data field. The acceptance RX filter 135 is configured to compare the message identifier, CANID, and further data to one or more filter value(s). If there is a match between at least the message identifier, CANID, and one filter value, then the buffered bit stream data is loaded into the receive RX buffer 130.1. The acceptance RX filter 135 may apply one or more filter masks to select, which bits should be compared with the filter values. The data of a received frame can then be retrieved from the receive RX buffer 130.1 via the host interface 140. The receive RX buffer 130.1 may be a FIFO-like (first in first out) buffer. It should be noted that the CAN controller 120 may comprise one or more acceptance RX filters, each of which may be associated with a separate receive RX buffer, into which the data of a received frame is loaded in case of a match.

According to an embodiment of the present application, the CAN controller 120 comprises a detector 180, which is arranged to detect an exclusive access phase, which occurs at the end of an arbitration phase during the broadcast of a message frame on the CAN bus 200. The detector 180 may be arranged in or with the protocol engine 125 of the CAN controller 120. The detector 180 may be part of the protocol engine 125 of the CAN controller 120. The exclusive access phase may be detected from the serial bit stream received from the bus transceiver 110. Once all bit coding a message identifier are received, which comprises 11 bits in case of a standard frame or 29 bits in case of an extended frame, the end of the arbitration phase is reached.

In response to the detection of the end of the arbitration phase, the detector 180 is configured to assert an enable signal, which is supplied to a diagnosis module 190 for instance arranged in or with the bus transceiver 110. The diagnosis module 190 is coupled to the CAN bus 200 and in particular to the lines CAN_H 210 and CAN_L 220 of the CAN bus 200. The diagnosis module 190 is configured to perform measurements and signal analyses on the CAN bus 200 and on the lines thereof on receiving the enable signal from the detector 180. After the end of the arbitration phase, the data and CRC data broadcasting phase begins, in which only one node/ECU is broadcasting and asserting signals on the CAN bus 200. Performing measurements and signal analyses on the CAN bus 200 when only one node/ECU is active on the CAN bus 200 ensures that the properties and characteristics obtained from measurements on the lines of the CAN bus 200 reflect true conditions and allow for reliable signal analyses.

Accordingly, the detector 180 is further configured to deassert the enable signal supplied to a diagnosis module 190 before again several nodes/ECUs assert signals on the CAN bus 200. The windows for performing measurements and signal analyses on the CAN bus 200 extends at least partly over the period used for broadcasting the plain message data and the cyclic redundancy code data (CRC).

The diagnosis module 190 may comprise a memory and be configured to store the measurements and/or signal analyses performed on the CAN bus 200 for retrieval via a data interface 160 such as a Serial Peripheral Interface (SPI) connected to the diagnosis module 190. The diagnosis module 190 may be further configured to store the message ID of the frame, during which broadcast the measurements and signal analyses has been performed. The message ID may be stored in association with the respective measurements and/or signal analyses e.g. for retrieval through the data interface 160.

Figure 4:
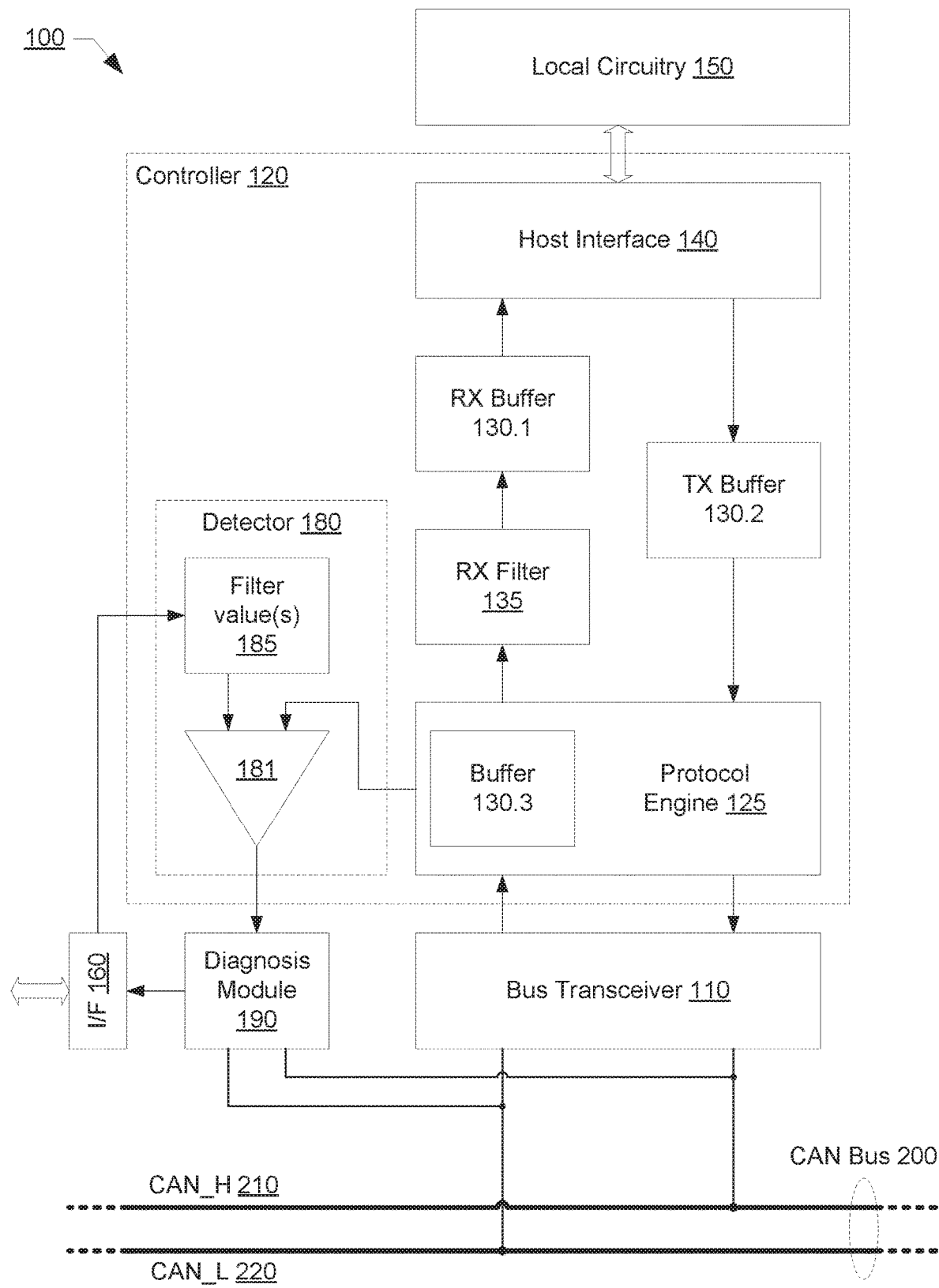
FIG. 4 schematically illustrates a block diagram of an electronic control unit, ECU, according to another example of the present invention.

Referring now to FIG. 4, a schematic block diagram of a node/ECU according to another embodiment of the present application is illustrated. The node/ECU 100 exemplified here with reference to FIG. 4 substantially corresponds to the node/ECU exemplified above with reference to FIG. 3. In order to omit unnecessary repetitions, the above description with reference to FIG. 3 applies likewise to the example node/ECU described in the following with reference to FIG. 4 as far as not described differently in the following.

The detector 180, which is provided to control the operation of the diagnosis module 190, further comprises a filter 181 to receive at least the message identifier, CANID, in the bit stream representing data of a received frame and configured to compare at least the message identifier, CANID, to one or more filter value(s) maintained in a storage 185 of the detector 180. If there is a match between the message identifier, CANID, and one filter value, then the detector 180 is configured to assert the enable signal for the diagnosis module 190 at the end of or after the arbitration phase. The filter value(s) applied by the filter 181 of the detector 180 may be configurable, e.g. through the data interface 160.

Figure 5:
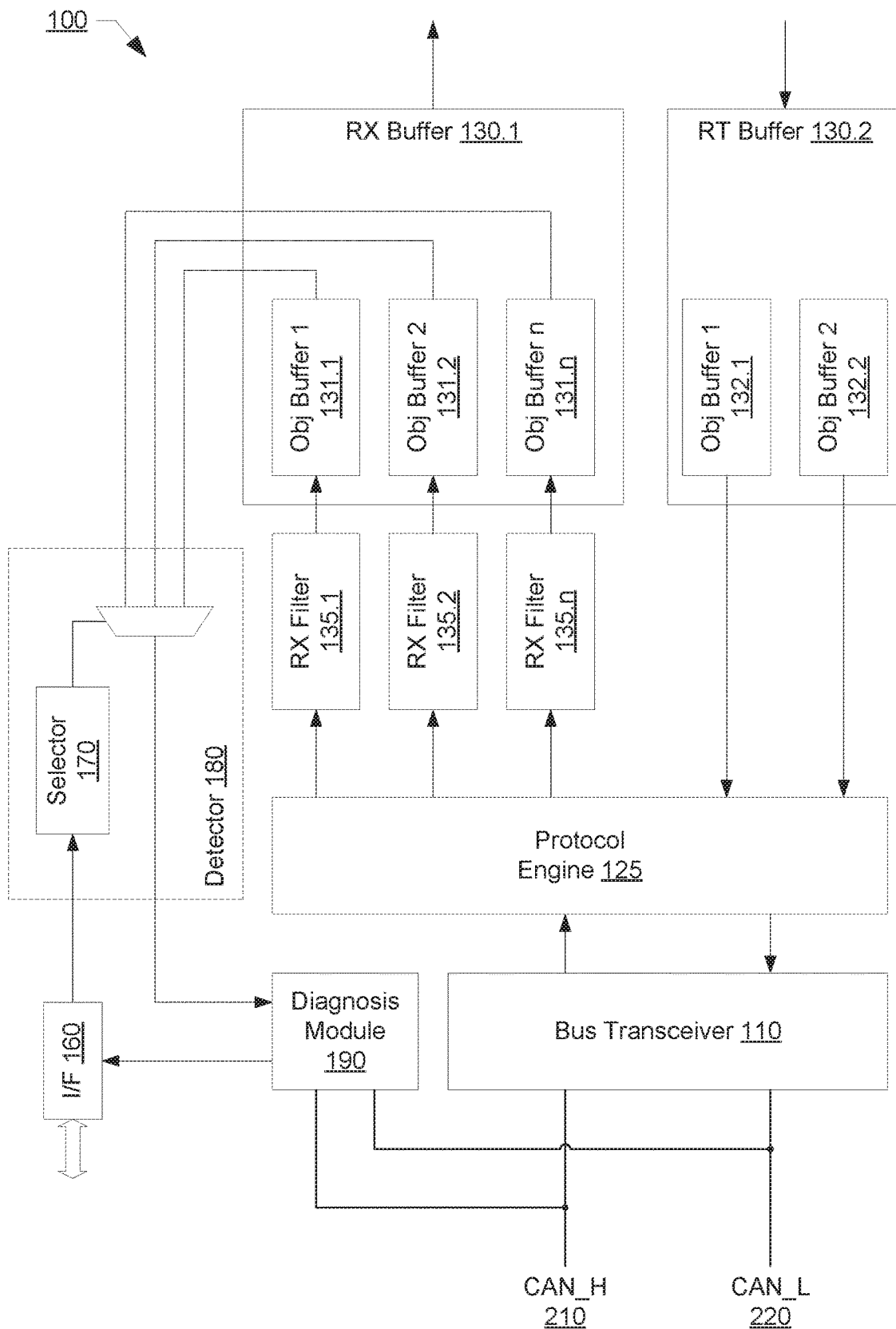
FIG. 5 schematically illustrates a block diagram of an electronic control unit, ECU, according to yet another example of the present invention.

Referring now to FIG. 5, a schematic block diagram of a node/ECU according to another embodiment of the present application is illustrated. The node/ECU 100 exemplified here with reference to FIG. 4 substantially corresponds to the node/ECU exemplified above with reference to FIG. 3. In order to omit unnecessary repetitions, the above description with reference to FIG. 3 applies likewise to the example node/ECU described in the following with reference to FIG. 4 as far as not described differently in the following.

As aforementioned, the receive path of the CAN controller 120 may comprise several acceptance RX filters 135.1 to 135.*n*, each of which is associated with a separate object buffer 131.1 to 131.*n* of the receive RX buffer 103.1.

Each acceptance RX filter 135.1 to 135.*n* is arranged to receive at least the message identifier, CANID, in the buffered bit stream representing data of a received frame and configured to compare at least the message identifier, CANID, to one or more filter values. The filter value(s) are configured specifically for each one of the acceptance RX filters 135.1 to 135.*n*. If there is a match between the message identifier, CANID, and one filter value, then the buffered bit stream data is loaded into the respective object buffer 131.1 to 131.*n*, which is associated to the acceptance RX filter 135.1 to 135.*n*, at which the match occurs.

The detector 180 is arranged to monitor the object buffer 131.1 to 131.*n* in order to detect the loading of data into the object buffer 131.1 to 131.*n*. The loading of data in one of the object buffers 131.1 to 131.*n* indicate that a frames is currently received, which has a message ID correspond to one of the or more filter values configured for the respective one of the acceptance RX filters 135.1 to 135.*n*. A selector 170 is arranged with the detector, to select, which one of the object buffers 131.1 to 131.*n* is monitored. The selector 170 is configurable, for instance via a data interface 160 such as the Serial Peripheral Interface (SPI). The selectability of the object buffer to be monitored by the detector 180 is illustrated by the means of a multiplexer controlled by the selector 170. Upon detection of data flowing into a selected one of the buffer objects 131.1 to 131.*n*, the enable signal is set, which controls the diagnosis module 190 to conduct the measurements and signal analysis.

Those skilled in the art will appreciate and understand that the above described partitioning of the exemplified nodes/ECUs into separate units, blocks and modules has been made to improve the intelligibility of description of the present invention only, without the intention to limit the present invention to one of the above described exemplary nodes/ECUs. The units, blocks and modules may be embedded into other ones. For instance, the filters 135.1 to 135.*n* and buffers 131.1 to 131.*n*, 132.1 and 132.2 may be embedded in the protocol engine 125. For instance, the detector 180 and/or the diagnosis module 190 may be embedded in the protocol engine 125 or the bus transceiver 110. For instance, the protocol engine 125 may be part of the bus transceiver 110. For instance, the CAN controller 120 and bus transceiver 110 may form a physical unit.

Figure 6:
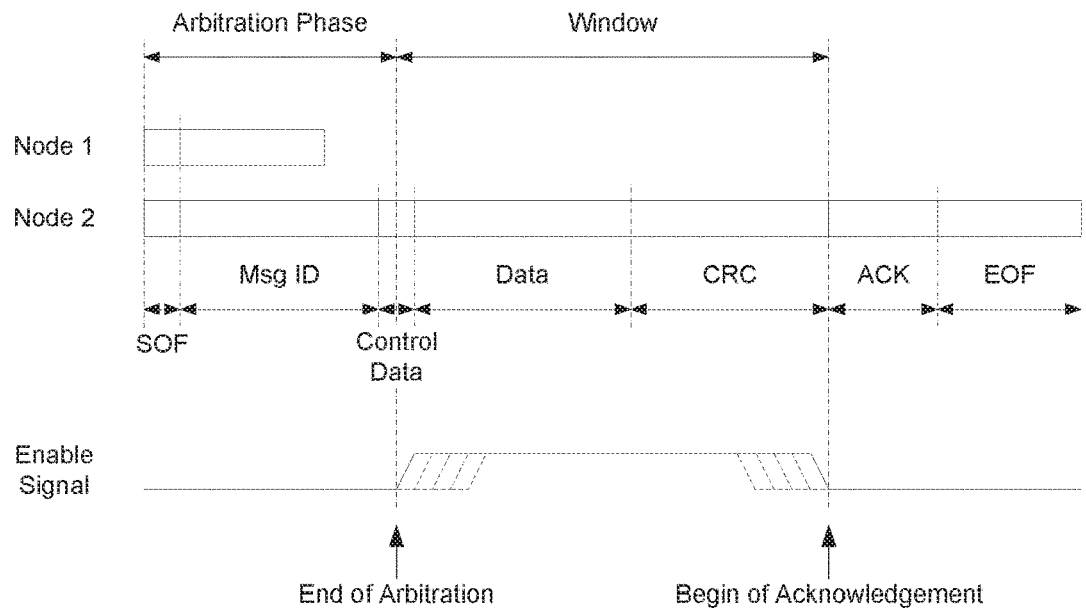
FIG. 6 schematically illustrates a timing diagram of a broadcast event on a CAN bus according to an example.

Referring now to FIG. 6, a schematic broadcast timing diagram according to an embodiment of the present application is illustrated. The timing diagram exemplified the different phases occurring during the broadcast of a data frame on a CAN bus, to which a plurality of nodes/ECUs is connected.

For the sake of illustration, two nodes, herein node 1 and node 2, start broadcasting data frames at the same time. The node 1 and node 2 assert a Start Of Frame, SOF, logic-0/dominant signal on the CAN bus and commence with asserting the signals representing the bit sequence of the respective message IDs on the CAN bus. The Start Of Frame, SOF, logic-0/dominant signal on the CAN bus indicates the beginning of the arbitration phase. The node 1 aborts the asserting of the bit sequence of the respective message ID on detecting that the CAN bus is in dominant state in mismatch with a recessive signal currently asserted by it.

The node 2 commences the asserting of the bit sequence of the respective message ID on the CAN bus. Once, the serial broadcasting of the message ID is completed, the arbitration phase ends. In case of a standard data frame, the reception of the complete message ID is for instance detectable from the IDE field, which value allows for distinguishing whether the currently broadcast data frame has standard data frame format and extended data frame format.

The period, during which the plain message data is broadcast, is referred to as data phase or data receiving phase. The period, during which the cyclic redundancy code (CRC) data is broadcast, is referred to as CRC data phase or CRC data receiving phase. The data and CRC data (receiving) phases represent the period, which comprise the measurement time window for conducting measurements and signal analyses because only one node/ECU, herein the node 2 for the sake of illustration, is allowed to assert signals on the CAN bus during the data and CRC data (receiving) phase. Because of the aforementioned, the data and CRC data (receiving) phases are also referred to as exclusive access phase. The measurement time window may begin with a predefined time margin after the beginning of the exclusive access phase and may end with a predefined time margin before the ending of the exclusive access phase.

The acknowledgement phase follows the broadcast of the cyclic redundancy code (CRC) data. During the acknowledgement phase, the receiver node of the broadcast data frame is active on the CAN bus. The setting of the enable signal output by the detector controls the diagnosis module to conduct the measurements and signal analyses within the measurement time window, which is within the data and CRC data (receiving) phases.

Figure 7:
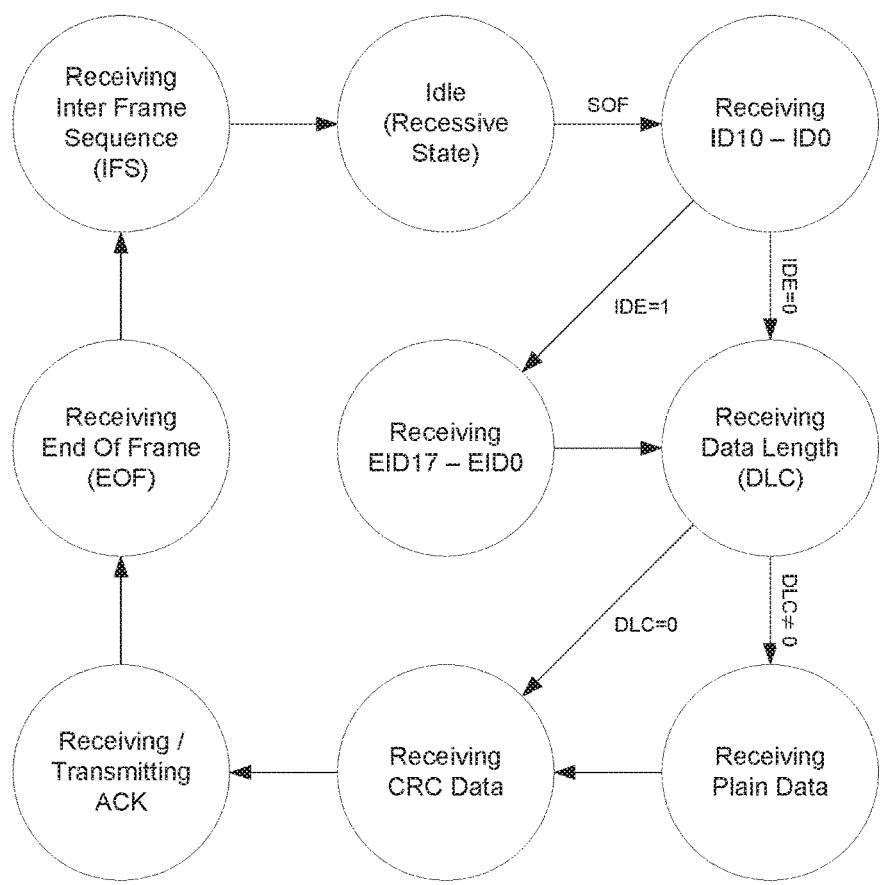
FIG. 7 schematically illustrates a state diagram of protocol engine of an electronic control unit, ECU, according to an example of the present invention.

With reference to FIG. 7, an exemplary state diagram of the finite state machine comprised in a protocol engine of a CAN controller according to an embodiment of the present application is schematically illustrated.

The state machine transitions between predefined states in response to the incoming bit stream of a frame broadcast on the CAN bus. Starting from idle bus state (the CAN bus is in recessive state) the state machine transitions to receiving the message ID bits on detecting a Start Of Frame (dominant) signal asserted on the CAN bus. Depending on the value of the IDE field, the state machine transitions to receiving the message ID bits according to the extended frame format or commences with receiving the length coding comprised in the control field. Further depending on the coded length of the data field, the state machine transitions firstly to receiving the plain message data or transitions directly to receiving the CRC data. After receiving the CRC data, the state machine transitions to acknowledge handling.

The states indicative of the receiving the plain message data and CRC data may be considered as indicative of the exclusive access phase referred to above, during which only one of the nodes/ECUs connected to the CAN bus is allowed to assert signals on the CAN bus (except of error signaling).

Those skilled in the art will immediately understand that the setting of the enable signal by the detector may be based on the states of the finite state machine comprised in a protocol engine.

Figure 8:
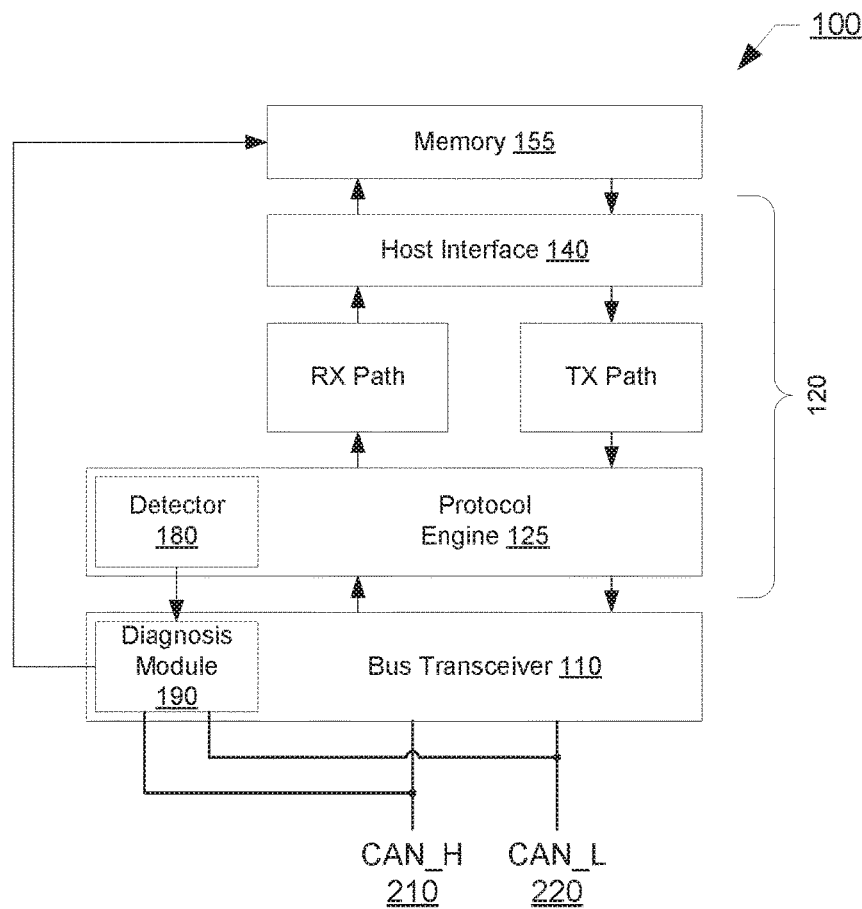
FIG. 8 schematically illustrates a block diagram of an electronic control unit, ECU, according to a further example of the present invention.

Referring now to FIG. 8, a schematic block diagram of node/ECU dedicated for diagnosis according to embodiments of the present application is illustrated. Whereas in the above examples, the integration of a diagnosis module into a node/ECU has been described, which supplements the functionality of the node/ECU with diagnosis functionality, a node/ECU dedicated only for diagnosis may be provided using the above described detector and diagnosis module.

The node/ECU 100 exemplified in FIG. 8 is dedicated to measurements and signal analyses on the CAN bus. As exemplified in FIG. 8, the measurement and/or signal analyses are stored in a memory 155, which is part of the local circuitry 150 connected to the CAN controller 120. The measurements and/or signal analyses may be broadcast by the node/ECU 100 over the CAN bus. The broadcasting of the measurement and/or signal analyses may be requested by another node via the CAN bus using a predefined request message. The detector 180 may comprise a filter as described above.

Figure 9:
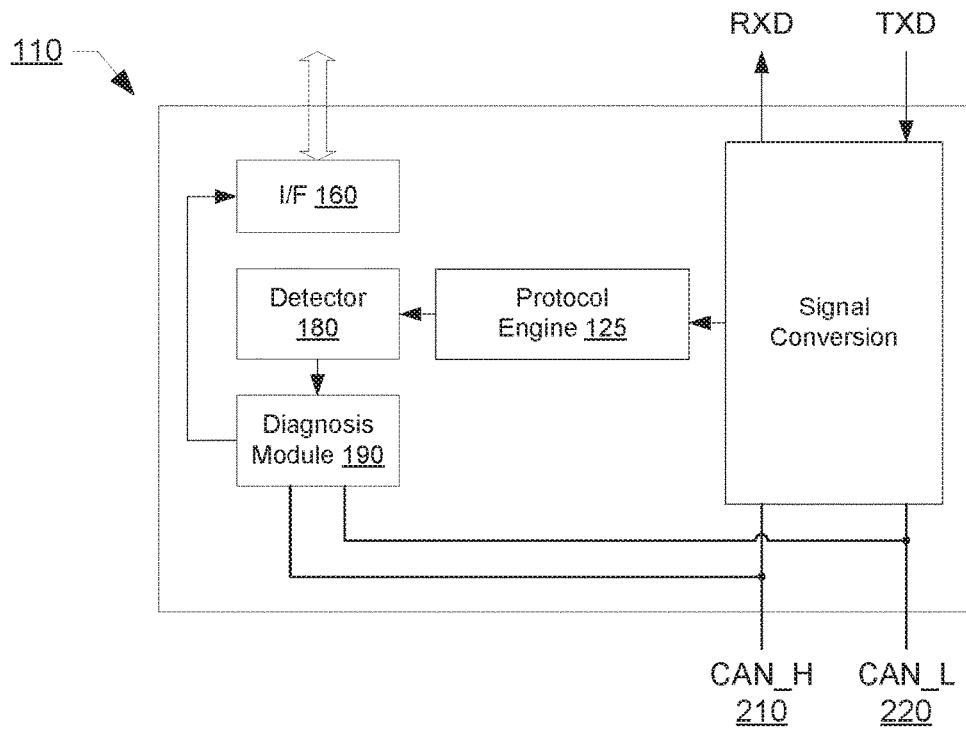
FIG. 9 schematically illustrates a block diagram of an advanced bus transceiver according to an example of the present invention.

Referring now to FIG. 9, schematic block diagrams of an according to embodiments of the present application is illustrated. The advanced bus transceiver may be applicable with any one of the aforementioned nodes/ECUs. The advanced bus transceiver 110 exemplified herein comprises the components to enable the above described measurements and signal analyses on the CAN bus. In particular, the advanced bus transceiver 110 comprises a protocol engine 125, a detector 180 and a diagnosis module 190.

The protocol engine 125 may be a protocol engine 125 configured to the diagnosis operation. For instance, the protocol engine 125 have limited functionality, which enables the detection of the measurement time window allowing the detector 180 to assert the enable signal within it. The asserted enable signal triggers the diagnosis module 190 to perform measurements within the measurement time window and to conduct a signal analysis based on the measurements. The measurements and/or signal analyses are stored by the diagnosis module 190 and may be accessible via a data interface 160 such as a Serial Peripheral Interface (SPI).

In an example, the protocol engine 125, a detector 180 and a diagnosis module 190 have the above described functionalities. For instance, the detector 180 may comprise a filter as described above.

The Controller Area Network (CAN) may be set up on the basis of several CAN buses, which are interconnected using topology components including CAN repeaters, CAN bridges and/or CAN gateways. CAN repeaters and bridges can be used to set up a CAN network with independent CAN subnetworks and CAN buses, so as allowing independent parts of the network with different transmission rates to be connected to each other. Using integrated filter functionality, frames may be filtered before transmitting from one to the other CAN subnetwork/CAN bus allowing reducing the load on the individual CAN subnetworks/CAN buses. In contrast to CAN repeaters, CAN bridges allow for increasing the effective length of a CAN bus by interposing CAN bridges to separate the CAN bus into multiple independent CAN buses. CAN gateways are used to interconnect three or more CAN networks. CAN gateways are also used to connect CAN bus to a different type of bus.

Providing the above described diagnosis functionality in a topology component has the advantage that the measurements and signal analyses may be applied to the several connected CAN buses and the connected nodes per CAN bus individually.

Figure 10:
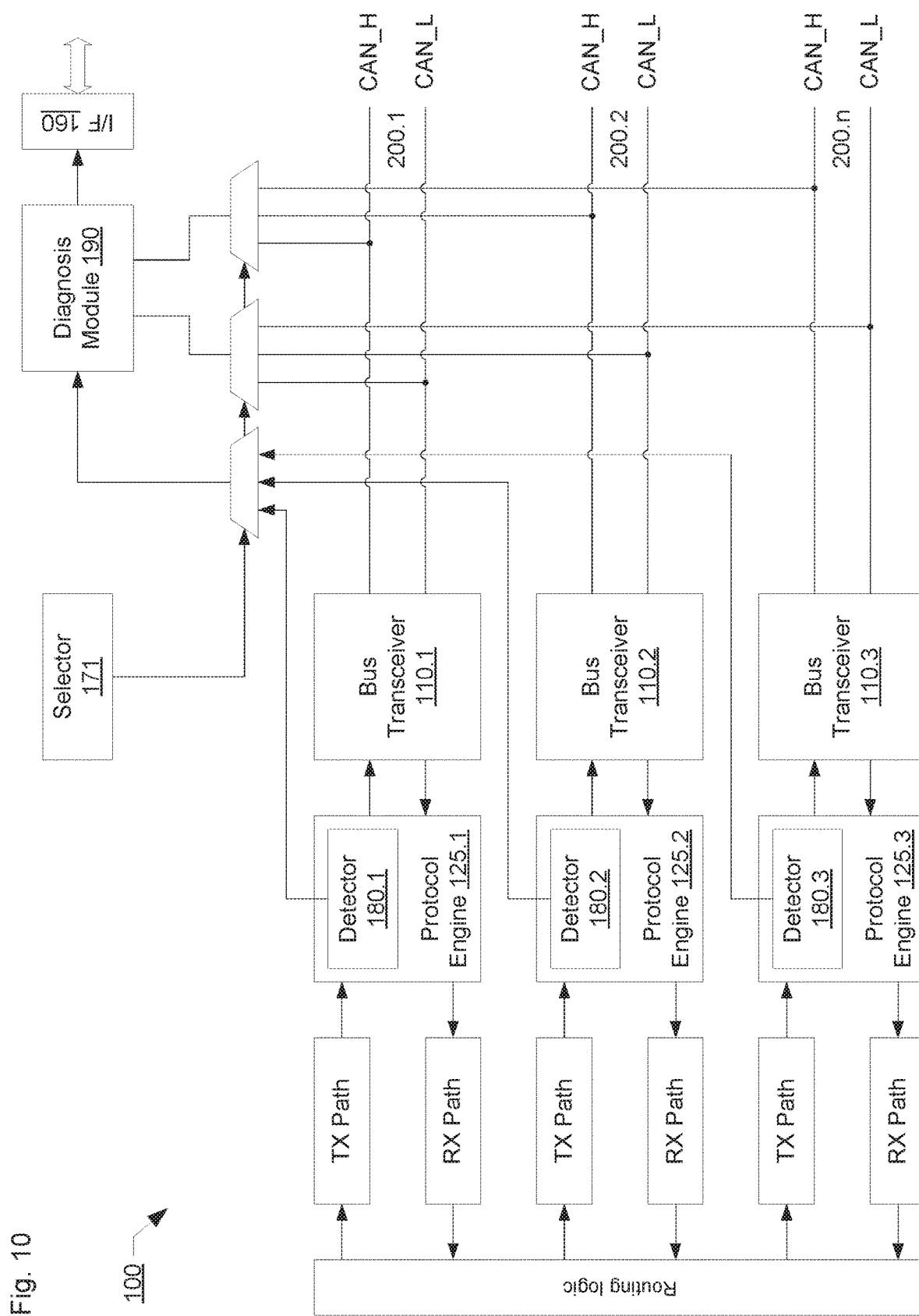
FIG. 10 schematically illustrates a block diagram of a gateway control unit according to an example of the present invention.

Referring now to FIG. 10, a schematic block diagram of a gateway node according to an embodiment of the present application is illustrated. The illustrated gateway node 100 interconnects three CAN buses, herein 200.1, 200.2 and 200.3, to each other for the sake of explanation. The illustrated gateway node further may offer integrated filter and routing functionality to filter frames received at one CAN bus before being routed to another CAN bus.

For each CAN bus, the gateway node 100 comprises a bus transceiver 110.1, 110.2 or 110.3 and a controller with a protocol engine 125.1, 125.2 and 125.3, with or in which a respective detector 180.1, 180.2 and 180.3 is arranged. Each of the detector 180.1 to 180.3 may be implemented as aforementioned.

The illustrated gateway node 100 further comprises a diagnosis module 190, which is selectively coupled to one of the CAN buses 200.1 to 200.3 for performing the measurements and signal analyses thereon. A configurable selector 171 selectively connects the diagnosis module 190 with the CAN_H and CAN_L lines of one of the CAN buses 200.1 to 200.3. The selector 171 is further used to selectively connect the enable signal of one of the detectors 180.1 to 180.3 to the diagnosis module 190. The selective connectivity is illustrated herein by the means of multiplexers controlled by the selector 171. The selector 171 is for instance configurable through the data interface 160 such as a Serial Peripheral Interface (SPI).

By configuring the selector 171, the CAN bus, on which the measurements and signal analyses are carried out in response to an enable signal asserted by the respective detector 180.1 to 180.3, is selectable.

The bus transceivers 110.1, 110.2 and 110.3 may be arranged in a multi-bus transceiver. The multi-bus transceiver may comprise the diagnosis module 190. The protocol engines 125.1 to 125.3 may be part of a multi-bus controller.

Figure 11:
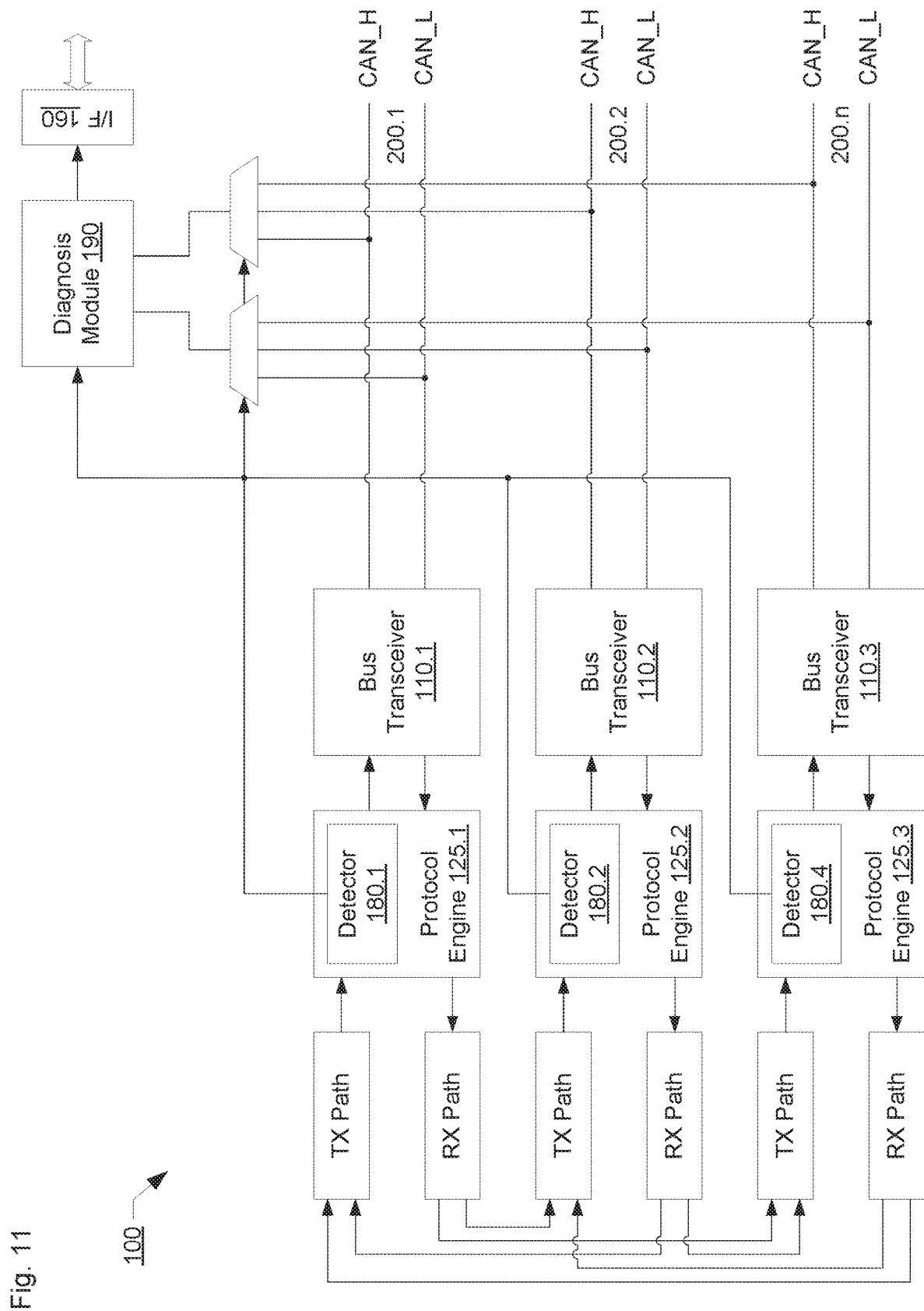
FIG. 11 schematically illustrates a block diagram of a gateway control unit according to another example of the present invention.

Referring now to FIG. 11, a schematic block diagram of a gateway node according to another embodiment of the present application is illustrated. The gateway node 100 exemplified here with reference to FIG. 11 substantially corresponds to the gateway node exemplified above with reference to FIG. 10. In order to omit unnecessary repetitions, the above description with reference to FIG. 10 applies likewise to the example gateway node described in the following with reference to FIG. 11 as far as not described differently in the following.

Herein, the detectors 180.1 to 180.3 control, to which CAN bus the diagnosis module 190 is switchably connected. For instance, each detector 180.1 to 180.3 may be configured to control conducting measurements and signal analyses in response to the detection of a message ID broadcast on a respective one of the CAN buses. The message ID may be recorded in association with the respective measurements and signal analyses as described above. An enable signal asserted by one of the detectors 180.1 to 180.3 may block enable signals asserted by the other ones to prevent from interruption of already conducted measurements and signal analyses.

It should be noted that although the above described refers to gateway nodes 100, the above description applies likewise to other topology components including in particular CAN repeaters and CAN bridges.

Figure 12:
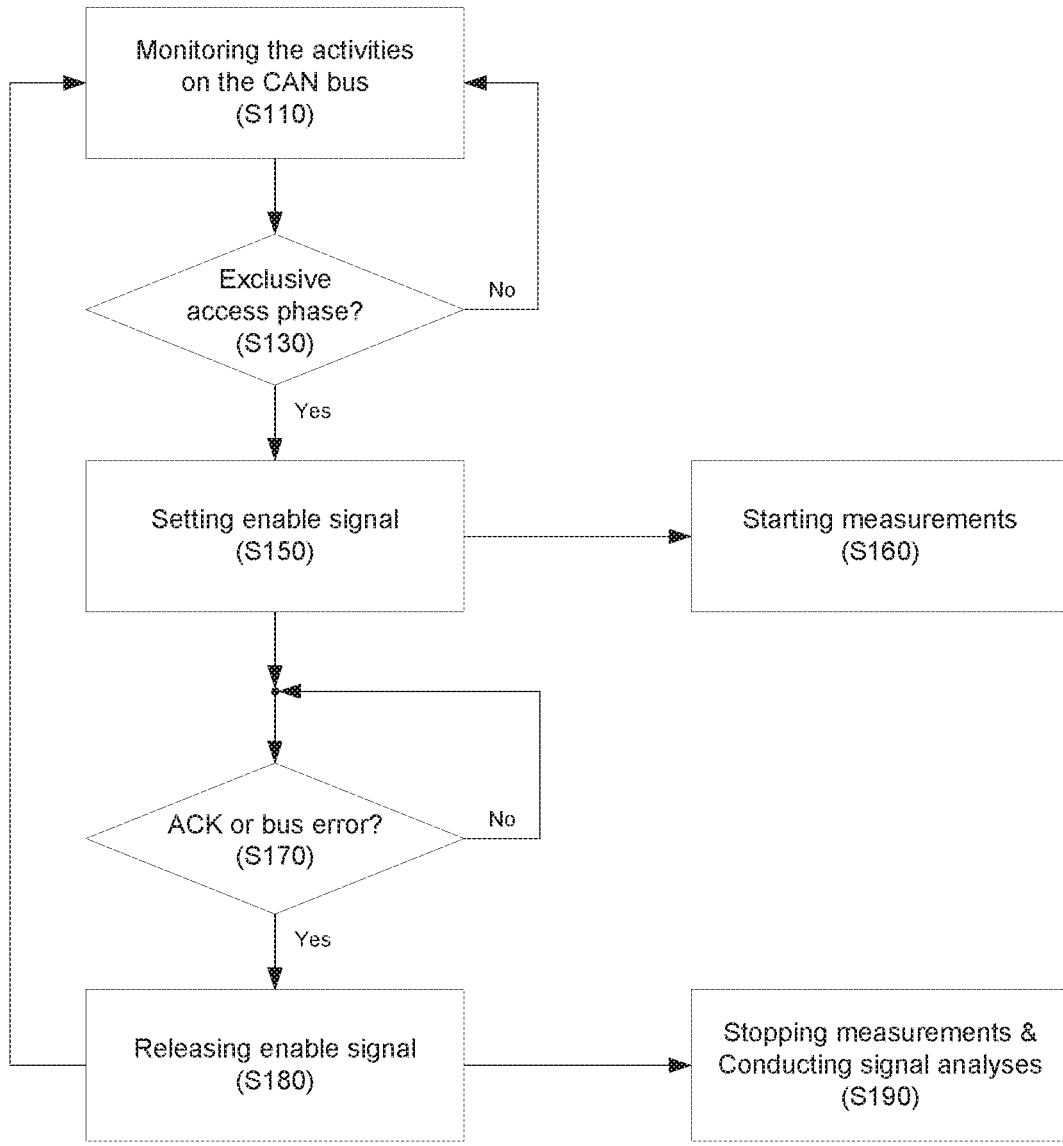
FIG. 12 schematically illustrates a flow diagram for conducting measurements and signal analyses according to an example of the present invention.

Referring now to FIG. 12, a flow diagram for conducting measurements and signal analyses according to an embodiment of the present application is schematically shown.

In an operation S110, the activities on the CAN bus are monitored by a detector of a node/ECU. The detector may be part of a protocol engine of a CAN controller, a bus transceiver or integral part of any other component of the node/ECU. The activities monitored on the CAN bus include in particular the phases defined by frame formats. The monitored activates for instance relate to an arbitration phase, a data and CRC data broadcasting phase, an acknowledgement phase, an End Of Frame, EOF, phase. The phases associated with activities on the CAN bus comprises at least one exclusive access phase, in which only one of the plurality of nodes/ECUs connected to the CAN bus asserts signals thereon. The activities on the CAN bus may be monitored by sequencing the bit stream received from a transceiver interfacing with the CAN bus and converting between logic signals and bus signals. In particular, the transceiver supplied a bit stream resulting from a frame broadcast on the CAN bus.

In an operation S130, it is verified whether or not the current phase is an exclusive access phase. In case the current phase is the exclusive access phase, the sequence continues with an operation S150. Otherwise, the monitoring of the activities on the CAN bus is continued in the operation S110.

In an operation S150, an enable signal is asserted. The enable signal is asserted within a time window defined by the exclusive access phase, which begins at the end of the arbitration phase and ends at the beginning of the acknowledgement phase (provided that there is no bus error indicated on the bus). The enable signal is output to a diagnosis module, which starts the measurements on the CAN bus in response to the asserted enable signal, in an operation S160.

In an operation S170, it is continuously monitored that the current phase is still the exclusive access phase. For instance, in case the acknowledgement phase is detected or a bus error indication issued by one of the nodes/ECUs connected to the CAN bus is detected, the end of the exclusive access phase has been reached and the sequence continues with an operation S180.

In the operation S180, the enable signal is deasserted. The enable signal is output to a diagnosis module, which stops the measurements on the CAN bus in response to the asserted enable signal, in an operation S190. The diagnosis module may further conduct a signal analysis based on the measurements made during the asserted enable signal.

It should be noted that the enable signal should be understood in the context of the present application to relate to a logic signal or condition responsive to which the measurements on the bus are conducted and/or to a physical signal used for controlling the performance of the measurements on the bus.

Figure 13:
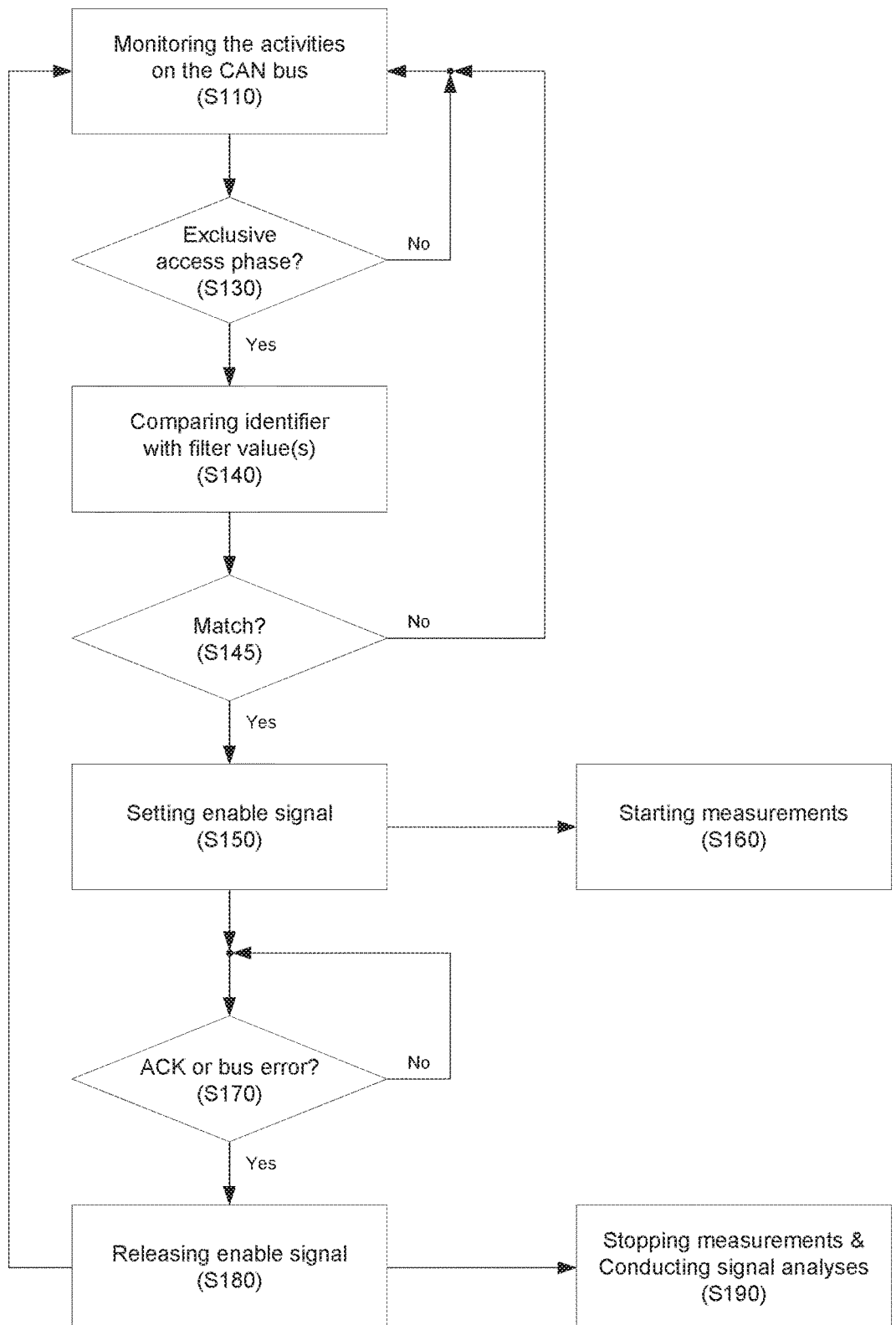
FIG. 13 schematically illustrates a flow diagram for conducting measurements and signal analyses according to another example of the present invention.

Referring now to FIG. 13, a flow diagram for conducting measurements and signal analyses according to another embodiment of the present application is schematically shown.

The flow diagram of FIG. 13 substantially corresponds to the flow diagram of FIG. 12 described above. In addition to the operation sequence of FIG. 12, on detecting that the current phase is an exclusive access phase, the sequence continues with operation S140. In the operation S140, an identifier comprised in the received bit stream is compared with one or more predefined filter values. In case one of the one or more predefined filter values match the identifier comprises in the received bit stream, the sequence continues with the operation S150 to enable the measurements on the CAN bus. Otherwise, the sequence returns to the operation S110.

The above concept to conduct measurements and signal analyses should not be understood to be limited to CAN protocol, CAN nodes/ECUs, CAN topology components and CAN buses. Those skilled in the art understand from the above description that the described concept is likewise applicable to any multi-master bus using carrier sense multiple access/collision detection CSMA/CD, in general.

According to an example of the present application, a node for conducting measurements on a bus supporting multi-master access of a plurality of nodes is provided. The node comprises: a transceiver, a protocol engine, a detector and a diagnosis module. The transceiver is connectable to the bus and configured to detect bus signals and to convert the detected bus signals into a bit stream. The protocol engine is coupled to the transceiver and is arranged to receive the bit stream. The protocol engine is configured to transition between different states. A selection of the states, which comprises predefined states, is indicative of an exclusive access phase, during which only one of the plurality of nodes is allowed to assert signals on the bus. The detector is connected to the protocol engine and is configured to assert an enable indication for a period of time on detecting that the protocol engine is in a state indicative of the exclusive access phase. The diagnosis module is connectable to the bus and responsive to the enable indication of the detector. The diagnosis module is configured to conduct measurements in response to the asserted enable indication. In an example, the enable indication is an enable signal.

According to an example of the present application, the protocol engine is arranged to sequence through the received bit stream and to transition between the states based on a frame format descriptive of the received bit stream. According to an example of the present application, the bus is a CAN bus. According to an example of the present application, the states are further indicative of at least an arbitration phase, a data receiving phase, a CRC data receiving phase and an acknowledgement phase. The exclusive access phase comprises at least one of the data receiving phase and the CRC data receiving phase.

According to an example of the present application, the detector is further arranged to assert the enable indication in case the received bit stream comprises an identifier matching a preconfigured filter value. According to an example of the present application, the identifier comprised at least a message identifier and more particularly a CAN message ID, CANID.

According to an example of the present application, the detector comprises a filter, which is preconfigured with one or more filter values. The filter is configured to compare the identifier comprised in the received bit stream with the one or more preconfigured filter values.

According to an example of the present application, the detector is arranged to monitor object buffers of the controller and to assert the enable indication in case a preconfigured one of the object buffers is enabled to receive data. According to an example of the present application, each object buffer is associated with one acceptance filter, which is preconfigured with one or more filter values. Each acceptance filter is configured to compare the identifier comprised in the received bit stream with the respective one or more preconfigured filter values and in response to one of the acceptance filters detect a match, the flow of data into the associated object buffer is enabled.

According to an example of the present application, the node is a topology node including a repeater node, bridge node, a gateway node.

According to an example of the present application, the node further comprises at least one further transceiver, wherein each transceiver is connected to a separate bus and configured to detect bus signals and to convert the detected bus signals into a bit stream, at least one further protocol engine, wherein each protocol engine is coupled to a respective one of the transceivers and configured to receive the respective bit stream, and at least one further detector, wherein each a detector is coupled to a respective one of the protocol engines and configured to assert an enable indication fora period of time on detecting that the respective protocol engine is in a state indicative of the exclusive access phase.

According to an example of the present application, the node further comprises a multiplexing component, which is coupled to the detector of each of the two or more protocol engines and the diagnosis module to selectively connect the enable indication of one detector to the diagnosis module.

According to an example of the present application, the node further comprises a multiplexing component, which is coupled to each one of the buses and the diagnosis module to selectively connect the lines of one of the buses to the diagnosis module. The buses are separate buses.

According to an example of the present application, the node further comprises a data interface connected to the diagnosis module, which is configured to store the measurements and/or signal analyses based on the measurements. The stored measurements and/or signal analyses are accessible via the data interface configured accordingly.

According to an example of the present application, a transceiver for conducting measurements on a bus supporting multi-master access of a plurality of nodes is provided. The transceiver is connectable to the bus and is configured to detect bus signals and to convert the detected bus signals into a bit stream. The transceiver comprises a protocol engine, a detector and a diagnosis module. The protocol engine is arranged to receive the bit stream and is configured to transition between states, which are indicative of at least an exclusive access phase, during which only one of the plurality of nodes is allowed to assert signals on the bus. The detector is connected to the protocol engine and is configured to assert an enable indication for a period of time on detecting that the protocol engine is in a state indicative of the exclusive access phase. The diagnosis module is connectable to the bus and is responsive to the enable indication of the detector. The diagnosis module is configured to conduct measurements in response to the asserted enable indication. In an example, the enable indication is an enable signal.

According to an example of the present application, the detector is further arranged to assert the enable indication in case the received bit stream comprises an identifier matching a preconfigured filter value. According to an example of the present application, the transceiver further comprises a data interface connected to the diagnosis module, which is configured to store the measurements and/or signal analyses based on the measurements. The data interface is configured to enable access to the stored measurements and/or signal analyses.

According to an example of the present application, a method for conducting measurements on a bus supporting multi-master access of a plurality of nodes connected thereto is provided. An enable indication is asserted by a detector for a period of time on detecting that a protocol engine is in a state indicative of an exclusive access phase. A protocol engine is coupled to a transceiver (110) arranged to receive a bit stream from it. The transceiver is connected to the bus and configured to detect bus signals and to convert the detected bus signals into the bit stream. The protocol engine is configured to transition between different states. A selection of the states, which comprises predefined states, is indicative of an exclusive access phase, during which only one of the plurality of nodes is allowed to assert signals on the bus. Measurements on the bus are conducted by a diagnosis module, which is connected to the bus, in response to the asserted enable indication of the detector.

According to an example of the present application, an identifier comprised in the received bit stream is compared with at least one preconfigured filter value and the enable indication is asserted in case the identifier matches one of the at least one preconfigured filter value.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A node for conducting measurements on a bus supporting multi-master access of a plurality of nodes, the node comprising:
   a transceiver connectable to the bus and configured to detect bus signals and to convert the detected bus signals into a bit stream;
   a state machine coupled to the transceiver and arranged to receive the bit stream, wherein the state machine is configured to transition between different states, wherein one or more predefined ones of the states are indicative of an exclusive access phase, during which only one of the plurality of nodes is allowed to assert signals on the bus except for error signaling;
   a detector connected to the state machine and configured to assert an enable indication for a period of time on detecting that the state machine is in a state indicative of the exclusive access phase; and
   a processor connectable to the bus and responsive to the enable indication of the detector, wherein the processor is configured to conduct measurements on the bus in response to the asserted enable indication.

2. The node according to claim 1, wherein the detector is further arranged to assert the enable indication in case the received bit stream comprises an identifier matching a preconfigured filter value.

3. The node according to claim 2, wherein the identifier comprises at least a message identifier.

4. The node according to claim 2, wherein the detector comprises a filter, which is preconfigured with one or more filter values, wherein the filter is configured to compare the identifier comprised in the received bit stream with the one or more preconfigured filter values.

5. The node according to claim 4, wherein the detector is arranged to monitor object buffers of the node and to assert the enable indication in case a preconfigured one of the object buffers is enabled to receive data.

6. The node according to claim 1, wherein the node comprises
   at least one further transceivers, wherein each transceiver is connected to another bus and configured to detect bus signals and to convert the detected bus signals into a bit stream,
   at least one further state machines, wherein each state machine is coupled to a respective one of the two or more transceivers and configured to receive the respective bit stream, and
   at least one further detector, wherein each detector is coupled to a respective one of the two or more state machines and configured to assert an enable indication for a period of time on detecting that the respective state machine is in a state indicative of the exclusive access phase.

7. The node according to claim 6, further comprising:
a multiplexer coupled to the detector of each of the two or more state machines and the processor to selectively connect the enable indication of one detector to the processor.

8. The node according to claim 6, further comprising:
a multiplexer coupled to the buses and the processor to selectively connect the lines of one of the buses to the processor.

9. The node according to claim 1, further comprising:
a data interface, which is configured to enable access to the measurements and/or signal analyses based on the measurements, wherein the measurements and/or the signal analyses are stored by the processor in a memory.

10. The node according to claim 1,
wherein the bus is a CAN bus;
wherein the states are further indicative of at least an arbitration phase, a data receiving phase, a cyclic redundancy code, CRC, data receiving phase and an acknowledgement phase, wherein the exclusive access phase comprises at least one of the data receiving phase and the CRC data receiving phase.

11. The node according to claim 1, wherein, when more than two nodes are connected to the bus, during the exclusive access phase, (i) only one node is allowed to assert signals on the bus and (ii) the remaining two or more nodes are not allowed to assert signals on the bus except for error signaling.

12. A transceiver for conducting measurements on a bus supporting multi-master access of a plurality of nodes, the transceiver connectable to the bus and configured to detect bus signals and to convert the detected bus signals into a bit stream, the transceiver comprising:
- a state machine arranged to receive the bit stream and configured to transition between different states, wherein one or more predefined ones of the states are indicative of an exclusive access phase, during which only one of the plurality of nodes is allowed to assert signals on the bus except for error signaling;
- a detector connected to the state machine and configured to assert an enable indication for a period of time on detecting that the state machine is in a state indicative of the exclusive access phase; and
- a processor connectable to the bus and responsive to the enable indication of the detector, wherein the processor is configured to conduct measurements in response to the asserted enable indication.

13. The transceiver according to claim 12, wherein the detector is further arranged to assert the enable indication in case the received bit stream comprises an identifier matching a preconfigured filter value.

14. The transceiver according to claim 12, further comprising:
- a data interface connected to the processor, which is configured to store the measurements and/or signal analyses based on the measurements, wherein the data interface is configured to enable access to the stored measurements and/or signal analyses.

15. The transceiver according to claim 12, wherein, when more than two nodes are connected to the bus, during the exclusive access phase, (i) only one node is allowed to assert signals on the bus and (ii) the remaining two or more nodes are not allowed to assert signals on the bus except for error signaling.

16. A method for conducting measurements on a bus supporting multi-master access of a plurality of nodes connected thereto, wherein the method comprises:
- detecting by a detector that a state machine is in a state indicative of an exclusive access phase,
- wherein a state machine is coupled to a transceiver arranged to receive a bit stream from it,
- wherein the transceiver is connected to the bus and configured to detect bus signals and to convert the detected bus signals into the bit stream,
- wherein the state machine is configured to transition between different states,
- wherein one or more predefined ones of the states are indicative of at least an exclusive access phase, during which one of the plurality of nodes asserts exclusively signals thereon except for error signaling; and
- conducting measurements by a processor, which is connected to the bus, for a period of time in response to the detection that the state machine is in the state indicative of the exclusive access phase.

17. The method according to claim 16, further comprising:
- comparing an identifier comprised in the received bit stream with at least one preconfigured filter value; and
- issuing the enable indication in case the identifier matches one of the at least one preconfigured filter value.

18. The method according to claim 16, wherein, when more than two nodes are connected to the bus, during the exclusive access phase, (i) only one node is allowed to assert signals on the bus and (ii) the remaining two or more nodes are not allowed to assert signals on the bus except for error signaling.

* * * * *